(12) United States Patent
Mauleon et al.

(10) Patent No.: US 6,375,715 B1
(45) Date of Patent: Apr. 23, 2002

(54) PROCEDURE AND DEVICE FOR FAST SEPARATION OF SOLID PARTICLES AND GASEOUS FLUIDS AND THEIR USE

(75) Inventors: Jean-Louis Mauleon, Sainte Croix sur Aizier; Cyrille Mirgain, Le Havre, both of (FR)

(73) Assignee: Total Raffinage Distribution S.A., Puteaux (FR)

( * ) Notice: Subject to any disclaimer, the term of this patent is extended or adjusted under 35 U.S.C. 154(b) by 0 days.

(21) Appl. No.: 09/475,277

(22) Filed: Dec. 30, 1999

(30) Foreign Application Priority Data

Dec. 31, 1998 (FR) .............................. 98 16706

(51) Int. Cl.[7] .......................... B01D 53/06; B01D 45/12
(52) U.S. Cl. ............................. 95/108; 95/109; 95/111; 95/148; 95/269; 95/272; 96/130; 96/132; 96/143; 96/150; 55/315; 55/331; 55/419; 55/447; 55/474
(58) Field of Search ............................ 95/108, 109, 111, 95/112, 141, 146, 148, 267, 269–272, 274–276; 96/123, 130–133, 135, 136, 143–146, 150, 153; 55/315, 317, 320–321, 331, 342–343, 418–419, 447, 474; 422/142

(56) References Cited

U.S. PATENT DOCUMENTS

| | | | | |
|---|---|---|---|---|
| 3,767,566 A | * | 10/1973 | Cartmell .................. | 208/120.1 |
| 4,419,965 A | | 12/1983 | Garcia-Mallol et al. .... | 122/4 D |
| 4,556,479 A | * | 12/1985 | Mauleon et al. ............. | 95/271 |
| 4,666,586 A | * | 5/1987 | Farnsworth ................. | 95/271 |
| 5,110,323 A | * | 5/1992 | Soni ........................... | 95/271 |
| 5,415,684 A | * | 5/1995 | Anderson .................... | 95/109 |
| 5,567,228 A | * | 10/1996 | Abdulally ................... | 95/109 |

FOREIGN PATENT DOCUMENTS

| | | |
|---|---|---|
| EP | 259 156 | 3/1988 |
| EP | 421 484 | 4/1991 |
| EP | 852 963 | 7/1998 |

* cited by examiner

*Primary Examiner*—Duane Smith
*Assistant Examiner*—Jason M. Greene
(74) *Attorney, Agent, or Firm*—Sughrue Mion, PLLC (57) ABSTRACT

A receptacle (14) open in its upper part into which opens a conduit (13), is inserted between a device (11) for fast extraction and the stripping zone (18). The receptacle (14) consists at its base of at least one diffuser (15) fed in fluidization gas and to which the solid particles are put in a dense fluidized bed state (17), whose density ranges between 300 and 800 kg.m$^{-3}$, then escape by overflow from the receptacle (14) toward the stripping zone (18) located below.

29 Claims, 3 Drawing Sheets

PROCEDURE AND DEVICE FOR FAST SEPARATION OF SOLID PARTICLES AND GASEOUS FLUIDS AND THEIR USE

BACKGROUND OF THE INVENTION

This invention relates to the separation of solid particles and gaseous fluids. More particularly its objective is a device and a procedure that make it possible to separate solid particles in an intimate mixture with gaseous fluids in a manner that is both fast and efficient.

The invention applies in particular to procedures of the thermal or catalytic type in which solid particles with an essentially coolant and/or catalytic effect, move in suspension within gaseous fluids, from which they must later be rapidly separated in order to be regenerated prior to being reused.

In the following, the invention is described in reference to procedures used in the oil industry, and in particular to the fluid-bed catalytic cracking procedure (commonly called FCC procedure from the English Fluid Catalytic Cracking), in which the gas/particle separation processes must be carried out in a fast and efficient manner. It must however be understood that the invention applies to any procedure that requires a fast separation phase of solid particles and gaseous fluids.

In the FCC procedure, a hydrocarbon charge, pulverized in the form of fine droplets, is put in contact with cracking catalyst grains at a high temperature that circulate in the reactor in the form of a diluted fluidized bed, meaning in suspension within a gaseous fluid that ensures or assists their transportation. When in contact with the hot catalyst, there is a vaporization of the charge, followed by the cracking of the hydrocarbon molecules on the active catalyst sites. After having reached the desired range of molecular weight, with a corresponding reduction of the boiling points, the gaseous effluents of the reaction are separated from the catalyst grains. These catalyst grains, deactivated because of the coke that has deposited on their surface, are then stripped, in order to recuperate the hydrocarbons that were entrained, then regenerated by combustion of the coke, and lastly are put back in contact with the charge to be cracked.

The reactors used are generally vertical reactors of the tubular type, in which the catalyst diluted fluidized bed moves following a flow that is essentially upward (the reactor is then called "riser") or following a flow that is essentially downward (the reactor is then called "dropper" of "downer").

As known in the art, the efficiency of the separation process of the solid particles of the catalyst and the gaseous fluids in which they that are put in suspension is a key factor in the catalytic cracking procedure.

In particular, when exiting the tubular reactor, it is important to separate the catalyst particles from the gaseous reaction fluids in a manner that is both complete and fast. Indeed, it is fundamental not to prolong, within the separation and stripping enclosure, the time of contact between the reaction effluents and the catalyst, as this inevitably leads to an over-cracking of these effluents, which results in an increased coking of the catalyst along with the formation of products that are too light such as dry gases (methane, ethane, ethylene), to the detriment of the sought-after intermediary hydrocarbons (gasoline, gas-oil). A separation that is either too slow or too incomplete (gaseous effluents entrained in the stripper), is thus penalized by a significant loss in terms of performance and selectivity of the procedure.

Today, various devices are used to separate the solid particles from a gaseous fluid in which they are dispersed. These separation devices, that may or may not be directly connected to the output of the reactor, are essentially separators of the ballistic type, that impart a rotary motion to the suspension, so that the particles separate from the gas through a centrifugal effect.

Among the various devices in existence, the ones most used at this time are those known to the man of the art under the name of "cyclones". These devices usually consist of a enclosure that is essentially cylindrical, in which the flow of gas and particles is introduced tangentially, and put in rotation around a winding axle that is more or less vertical. The particles thus concentrated on the walls of the separator fall into the lower part of the latter where they are discharged, through a first conduit that generally directs them toward the bottom, in the direction of an area where they are collected. The gaseous fluid concentrates in the upper part of the separator, from where it is discharged by a second conduit, that carries it toward an appropriate treatment system.

This device has the advantage of carrying out a separation of very high quality: the separated particles contain a very low quantity of gaseous fluids, and vice versa. However, such a system of separation lacks speed. Indeed, the particles make several full circles in the cylindrical enclosure, which prolongs by as much and in an undesired fashion, the period of time during which they are in contact with the gaseous fluids.

The various improvements that have been proposed in the prior art aim at improving even more the actual quality of the separation by cyclone, but do not solve, or may even aggravate, the problem of the slowness of this process.

Thus patent U.S. Pat. No. 4,446,107 proposes to improve the performances of the cyclones by providing the output of the discharge conduit of the separated particles with a sloped valve that opens regularly under the weight of the particles when the latter have accumulated in a sufficient quantity. This valve, when in a closed position, establishes a counter-pressure in said conduit, so that the gaseous fluids are less aspirated in this direction. It results in an improvement of the degree of separation.

Nevertheless, the repeated openings and closings of the valve result in significant variations of the counter-pressure exerted in the discharge conduit of the separated particles. These instabilities disturb the separation process and, in the end, strongly damage the quality of the latter.

In order to remedy the instability of the above-mentioned system, patent U.S. Pat. No. 5,055,177 proposes to install, around the output of the discharge conduit, outside the separated particles cyclone, a container equipped at its base with a drain of rather restricted size. This container is designed to collect the separated particles that pile up around the output of said conduit and thus act as a real stopper gasket. The particles escape from the container through the drain, and possibly by overflow (depending on the size of the drain and the flow of separated particles arriving from the conduit). The container can possibly be equipped with a vapor injection system so as to avoid coking inside said system.

The particles that are thus piled up around the output of said conduit carry out the same type of counter-pressure as the sealing valve described in U.S. Pat. No. 4,446,107 A, but this time in a constant manner, so much so that the quality of the separation is improved (better rate of separation). However, there again, the improvement takes place to de detriment of the speed of the separation: the watertight plug made by the accumulation of the catalyst at the output of the conduit, while achieving a significant counter-pressure, slows down by as much the speed at which the particles separate toward the lower part of the cyclone, and such a system therefore only prolongs further the time of separation that is already too long.

To compensate for the lack of speed of the cyclonic type separation systems, other techniques of ballistic separation have been proposed, in particular separators with a horizontal winding axis, directly connected to the reactor's output, as for example, those proposed in EP 332 277 A or in FR 2 758 277 A.

The separator described in EP 332 277 A imparts a half turn around a horizontal axis, to an upward flow of gas and particles. The particles projected against the walls are discharged toward the lower part whereas the gaseous fluid is extracted by means of a conduit arranged in the axis of rotation. This device has the undeniable advantage of carrying out an extremely fast separation of the gas and particle mixture. However, a part of the gaseous fluid, often a significant part, is entrained with the solid particles, in the discharge conduit of the latter, resulting in a degree of separation that is usually insufficient.

Therefore, none of the above-mentioned devices makes it possible to conciliate quality and speed in the processes of separation of gas and solid particles. These two parameters even seem contradictory since in the prior art the improvement of one is done to the detriment of the other.

To compensate for the insufficiencies of the devices of the prior art, a solution traditionally used in the field of FCC, consists in using a "fast" type separator (for example with a horizontal winding) and arranging for the solid particle discharge conduit to plunge directly into the concentrated particle stripping fluidized bed located below. While inducing a counter-pressure in said discharge conduit, this results in reducing the quantity of gaseous fluids entrained in this conduit, which results in a more efficient separation.

However, this simple and in theory not very costly solution does have many problems when put into practice. In particular, we must avoid immersing the separated particle discharge conduit too deep in said stripping bed, as this disturbs the treatment processes of the particles that take place therein. In consequence, if we wish to keep the extremity of the conduit immersed, we must keep the level of the stripping bed quite constant, which is extremely restrictive when carrying out the procedure, where it is, on the contrary, necessary to be able to allow for variations of the level of this bed. For this reason, in practice, this solution is not very sound to the extent that it is most harmful to the operational flexibility and the performances of the procedure.

Continuing her research in the matter of separation of gas and particle flows, the applicant has perfected a device and procedure that make it possible to remedy, in a simple and efficient manner, the insufficiencies of the prior art. In particular, the invention proposes an original solution that makes it possible to conciliate quality and speed in the separation processes of mixtures of gaseous fluids and solid particles.

SUMMARY OF THE INVENTION

This with end in view, the object of this invention is a device for the separation of solid particles and gaseous fluids consisting of a fast means of extraction, of a type known in itself, for the discharge of at least a fraction of gaseous fluids, and at least one conduit making it possible to direct the resulting particle enriched flow from top to bottom, toward a fluid-bed stripping zone also of a type known in itself.

This device is characterized by the fact that a receptacle, open in its upper part and into which opens said conduit, is inserted between said means of fast extraction and said area of stripping, and by the fact that this receptacle consists, at its base, of at least one diffuser fed with fluidization gas and thanks to which the solid particles are brought into a dense fluidized bed with a density ranging between 300 and 800 $kg.m^{-3}$ then escape from said receptacle by overflow toward said stripping zone located below.

In this invention, by means of fast extraction, we mean any means known in itself that makes it possible to eliminate at least a fraction of said fluids from the mixture of gaseous fluids and solid particles, in as short a period of time as possible, advantageously less than one second, preferably less and 0.5 seconds, and more preferably less that 0.2 seconds. The objective of this means is not to carry out a perfect separation of the gaseous fluids and the particles, as those performed with the cyclonal type separators. On the contrary it is a coarser separation, where the objective is to withdraw, as fast as possible, the majority of the particles from the gaseous fluid, in order to prevent the latter from staying in contact with particles for a prolonged period of time.

Various means can be used to this end. Advantageously, the means of extraction consists of a ballistic separation system with a horizontal winding axis that imparts a rotation with an angle ranging between 30 and 190 degrees around the axis to the mixture to be separated, while laterally extracting at least a fraction of the gaseous fluids. With this end in view, separators such as those described in the application for patent FR 2 758 277 are excellent examples of such a means of extraction.

Thus, the device as set forth in the invention performs a first separation that is extremely fast (fast extraction of a fraction of the gaseous fluids), and therefore relatively coarse, then carries the resulting flow enriched in particles but still containing gaseous fluids toward the bottom, and plunges this flow directly inside said receptacle, within a fluidized bed with a density ranging between 300 and 800 $kg.m^{-3}$.

For such a range of densities, it has been proved that the quantity of gaseous fluids entrained in the flow resulting from the first separation is notably reduced: a regular and moreover an optimal counter-pressure is exerted at the level of the output of the routing conduit toward the bottom of the resulting flow, with the result that a maximum quantity of gaseous fluids is discharged, upstream, in the fast extraction means, without however leading to a loss in terms of speed of the extraction procedure. By counterbalancing in this way the entrainment phenomenon of the gaseous fluids, we greatly improve the quality of the fast separations, without any degradation in their speed.

Thus the device as set forth in the invention makes it possible to meet the afore-mentioned objectives, that is to say to conciliate speed and quality of the processes of separation of gaseous fluids and solid particles, without the inconveniences inherent to the techniques of the prior art.

In particular, the routing conduit toward the bottom of the resulting particle enriched flow does not plunge into the stripping bed of the separated particles. On the contrary it opens into an intermediary fluidized bed with a chosen density and that is completely independent from said stripping bed since it is entirely contained in a receptacle located above.

We thus improve the efficiency of the separation, without in any way reducing the operational flexibility of the procedure: the level of the stripping bed no longer has an impact on the efficiency of the separation and it can vary as much as necessary for the good conduct of the procedure.

Furthermore, the fact that the routing conduit toward the bottom of the particle enriched flow does not open directly into the stripping bed makes it possible to avoid disturbing the particle treatment procedures that are carried out therein. Indeed, the introduction, directly inside the stripping bed, of non-treated particles accompanied by a variable quantity of gaseous fluids, has the direct effect of mixing gaseous fluid and non-treated particles with partially treated particles that are thus once again contaminated. Thanks to the device as set forth in the invention, the particles escape from said receptacle by overflow and thus fall to the surface of the stripping bed located below, in which they can then be progressively treated as they progress in this bed, against the current of a treatment fluid.

In addition, the device as set forth in the invention not only makes it possible to act on the quality of the separation by reducing the rate of gaseous fluids entrained with the particle enriched flow, but it also makes it possible to complete this separation. Indeed, the remaining quantity of gaseous fluids entrained with the particles ends up in the dense fluidized bed contained in the receptacle where it is separated from the particles, because it is entrained toward the top by the fluidization gas that escapes from said dense fluidized bed, whereas the particles overflow from the receptacle and escape toward the bottom. Thus, the device as set forth in the invention makes a real secondary separation, downstream from the means of extraction.

Lastly, for the units that already contain a separation system that is able to quickly extract a fraction of the gaseous fluids, the device as set forth in the invention has proved to be particularly simple to implement, since all it takes is to insert, downstream from said system, at the foot of the routing conduit (or conduits) of the particle enriched flow, one or several receptacles equipped with a diffuser and a means of feeding fluidization gas. Easy to implement and relatively low in cost, the device as set forth in the invention has therefore proved to be extremely advantageous in the frame of the modernization of the existing units.

The invention also encompasses the procedure of separation related to the device described above and therefore its objective is a procedure for separating solid particles and gaseous fluids, in which there is a fast extraction phase whose duration is less than one second that makes it possible to discharge at least a fraction of the gaseous fluids, then, the resulting particle enriched flow is directed toward the bottom, through at least one conduit, toward an fluid-bed stripping zone of a type known in itself, where this procedure is characterized by the fact that we introduce the resulting flow directly inside a dense fluidized bed of particles with a density ranging between 300 and 800 kg.m$^{-3}$, arranged above the stripping zone, and entirely contained in at least one receptacle out of which the particles escape by overflow toward the stripping zone located below.

A first advantage of the procedure as set forth in the invention is that it gives the user control over the parameters of the separation. Indeed, since the dense fluidized bed contained in the receptacle is totally independent from the rest of the unit, it is possible to vary its density, for example by adjusting the D1 flow rate of the fluidization gas introduced into the receptacle which results in varying the counter-pressure exerted at the output of the routing conduit toward the bottom of said resulting particle enriched flow.

In particular, it is advantageous to regulate the flow rate D1 of fluidization gas introduced into the receptacle based on the quantity of gaseous fluids that is entrained, after the extraction, in the resulting particle enriched flow. In particular, we can adjust said flow rate D1 so as to maintain, at the output of the routing conduit toward the bottom of the resulting particle enriched flow, a counter-pressure sufficiently elevated for the quantity of gaseous fluids entrained with the resulting particle enriched flow to be less or equal to 15%, preferably less or equal to 5%, of the initial quantity of gaseous fluids to be separated from the solid particles.

Thus we can adjust the degree of separation to the level required and make it vary if necessary, an operational flexibility that none of the systems described in the prior art allows.

As set forth in the invention, the bed of particles contained in the receptacle is advantageously maintained in the fluidized state by introduction, in its lower part, of at least one fluidization gas, with a D1 flow rate such that the density of this bed ranges between 300 and 800 kg.m$^{-3}$ and, preferably, between 600 and 700 kg.m$^{-3}$.

Furthermore, it is particularly advantageous to adjust the D1 flow rate of the fluidization gas so as to maintain the surface velocity of this gas in the dense fluidized bed of particles contained in the receptacle at a value ranging between 0.1 and 40 cm.s$^{-1}$ included and, preferably, ranging between 0.1 and 20 cm.s$^{-1}$ included.

The fluidization gas can be all gas or a gaseous mixture compatible with the procedure. In particular, and this is an undeniable advantage of the procedure as set forth in the invention, the fluidization gas can be chosen so as to carry out a pretreatment of the particles upstream from the treatment that will be performed in the stripping zone located below.

In particular, advantageously the fluidization gas that is introduced contains water vapor, alone or mixed with other gases, which makes it possible to perform a real prestripping, favoring the desorption of the more volatile part of the gaseous fluids adsorbed on the solid particles or those entrained in the pores of the latter. The particles, when they later arrive in the stripping zone, are therefore less "contaminated", and the quality of the fluid-bed stripping procedure is greatly improved.

Furthermore, the fluidization gas can contain, in a small quantity, constituents whose function is to carry out a pretreatment of the solid particles such as a conditioning, a passivation, which make it possible to ease and improve the later treatments to which the solid particles will be submitted, not only the stripping but also the regeneration of these particles.

In the device as set forth in the invention, the receptacle is positioned so that the routing conduit toward the bottom of the resulting particle enriched flow opens directly inside this receptacle, in the dense fluidized bed of particles that it contains, with an overflow height H advantageously ranging between 50 cm and 2 m included, and preferably between 50 cm and 1 m included. The term overflow height designates the conduit length that is immersed in the dense fluidized bed of particles and corresponds to the difference in height between the lower extremity of the routing conduit and the upper extremity of the lateral walls of the receptacle.

Furthermore, the lateral surface, at the output of the routing conduit toward the bottom of the resulting particle enriched flow, preferably ranges between 0.7 and 1.5 times the section of this conduit. The term lateral surface designates the surface of the fictitious hollow cylindrical tube, whose section is equal to that of the routing conduit, and whose height h is equal to L–H, with L being the height of the dense fluidized bed contained in the receptacle and H being the height of the overflow. In other words, it is the surface of the fictitious hollow cylindrical tube that would extend the routing conduit up to the base of the dense fluidized bed.

The receptacle contains at its base at least one diffuser that makes it possible to feed the bed of particles with fluidization gas. This diffuser is itself fed with fluidization gas through a line, advantageously equipped with a means for regulation the flow rate D1 of this gas. This makes it possible to precisely adjust the D1 flow rate, in particular so as to optimize the density of the fluidized bed of particles contained in the receptacle.

Advantageously, the flow D1 of the fluidization gas is adjusted so as to maintain the surface velocity of this gas in the dense fluidized bed of particles contained in the receptacle at a value ranging between 0.1 and 40 $cm.s^{-1}$ included and preferably between 0.1 and 20 $cm.s^{-1}$.

The diffuser can consist of any means that will make it possible to free, in a homogenous and finely divided manner, the fluidized gas at the base of the bed of particles contained in the receptacle. It can for example consist of an arrangement of one or several tubes, possibly in a cluster, evenly equipped with slits or holes in order to allow for a better distribution of the fluidization gas. In a particularly advantageous manner, the diffuser consists of an annular tube, arranged flat in the lower part of the receptacle, and equipped with slits or holes in its upper half.

According to one preferred method, the diffuser consists of a chamber that occupies the lower part of the receptacle, and whose upper wall, on which rests the dense fluidized bed of particles, is evenly pierced with small holes through which the fluidization gas is distributed over all the lower surface of the fluidized bed.

The receptacle is advantageously delimited by one or several lower walls that make up its bottom and which is surrounded by one or several more or less vertical lateral walls, thus forming an "enclosure" without a cover. Its transversal section can have any shape and is advantageously circular, square or rectangular.

The dimensions of this receptacle depend on the space that is available between the fast extraction means and the stripping zone located below. Preferably they are such that the dense fluidized bed contained in this receptacle is much smaller than the stripping fluidized bed. The section of the receptacle must be greater than that of the routing conduit toward the bottom of the particle enriched flow since this conduit opens directly into this receptacle. Advantageously, the section of the receptacle ranges between 1.5 and 6 times that of the conduit (or conduits) that plunge into it.

Furthermore, the receptacle is made of a material chosen to resist the operational conditions of the procedure that is being considered. In the case of catalytic cracking, the material in question must resist, on the one hand, very high temperatures and, on the other hand, attrition due to the very fast circulation of the catalyst particles. Therefore, it can be made for example of ceramic and/or refractory steel.

According to one preferred method, the receptacle is equipped at its base with one or several holes or drains, with a total section ranging between 3% and 20% of the section of the receptacle. Such a system makes it possible to discharge possible agglomerates of particles through the base of the receptacle as well as various debris such as the metal debris or other materials that make up the unit and were torn and entrained by the particles that usually circulate at high speed. A fraction of the particles then also escapes through this hole but the reduced section thereof in relation to that of the receptacle is such that most of the particles exit through the top of the receptacle, by overflow out of the latter.

Advantageously, the upper edge of the lateral wall (or walls) of the receptacle are serrated. This makes it possible, when the particles overflow, to favor the separation and entrainment toward the top of the remaining fraction of the gaseous fluids that were not discharged by the extraction means and were entrained in the receptacle with said resulting particle enriched flow. This serrated edge also favors the escape by overflow of the solid particles out of the receptacle, as well as a homogenous distribution, in a sprinkle, of these particles on the surface of the stripping fluidized bed located below, without disturbing the treatment procedures that take place in the latter.

In the device as set forth in the invention, the receptacle is positioned above the stripping zone, at the foot of the conduit(s) that discharges said resulting particle enriched flow out of the fast extraction means, and carries them toward the bottom. The receptacle can be maintained in this position using various means, such as, for example, one or several arms connected to the internal walls or to other elements attached to the inside of the unit. It can also advantageously be supported by three arms spaced at 120° C. and attached to the internal walls of the enclosure where the separation takes place.

Among the means of fast extraction that are likely to be used in the invention, some divide the mixture of gaseous fluids and solid particles to be separated which allows for a better extraction of said fluids. This is the case for example, systems such as those described in EP 332 277 A where a lateral extraction of gaseous fluids is carried out simultaneously in a plurality of parallel separation chambers. In this case, the resulting particle enriched flow consists in fact of at least two flows, transported separately toward the bottom by at least two more or less parallel conduits, usually vertical.

It is obvious that the invention also encompasses this form of implementation and different variants are then possible.

According to a first variant, the conduits each open into an independent receptacle containing a fluidized bed of particles with an appropriate density.

According to a second variant, at least two conduits open into a common receptacle, containing one single and same dense fluidized bed of particles. This solution has the advantage of avoiding the multiplication of the number of fluidized beds, and thus reduces the necessary equipment (receptacles, fluidization gas diffusers . . . )

In the procedure as set forth in the invention, the temperature of the dense fluidized bed contained in the receptacle can be equal to or, on the contrary, be different from that of the stripping bed located below. According to one preferred method, the temperature of said dense fluidized bed is greater than that of the stripping bed, which makes it possible to favor the separation of the remaining quantity of gaseous fluids entrained with the particles in the receptacle. Indeed, the entrainment of these remaining gaseous fluids by the fluidization gas introduced in the receptacle is better at a higher temperature. The temperature of this dense fluidized bed can be controlled in various ways, in particular by appropriately adjusting the temperature of the fluidization gas introduced in the receptacle.

The invention can be used in any industrial procedure requiring a fast and efficient separation phase of gaseous fluids and solid particles, of which, in particular, but without being limited thereto, procedures of the fluid-bed thermal cracking and catalytic cracking type.

In the case of fluid-bed catalytic cracking, the invention can, in a particularly advantageous manner, by implemented at the level of the separation phase performed, at the output of the reactor, between the reaction effluents (hydrocarbons in gaseous state) and the deactivated particles of the catalyst, whether the reactor is a "riser" or "downer" type.

BRIEF DESCRIPTION OF THE FIGURES

Various forms of implementation of the invention will be described hereafter in more detail, in reference to the attached drawings. The latter aim only at illustrating the invention and are in no way limitative in character as the device and the procedure that are the object of this invention can be implemented following many different variants.

About these drawings.

DETAILED DESCRIPTION OF THE PREFERRED EMBODIMENTS

Figure 1:
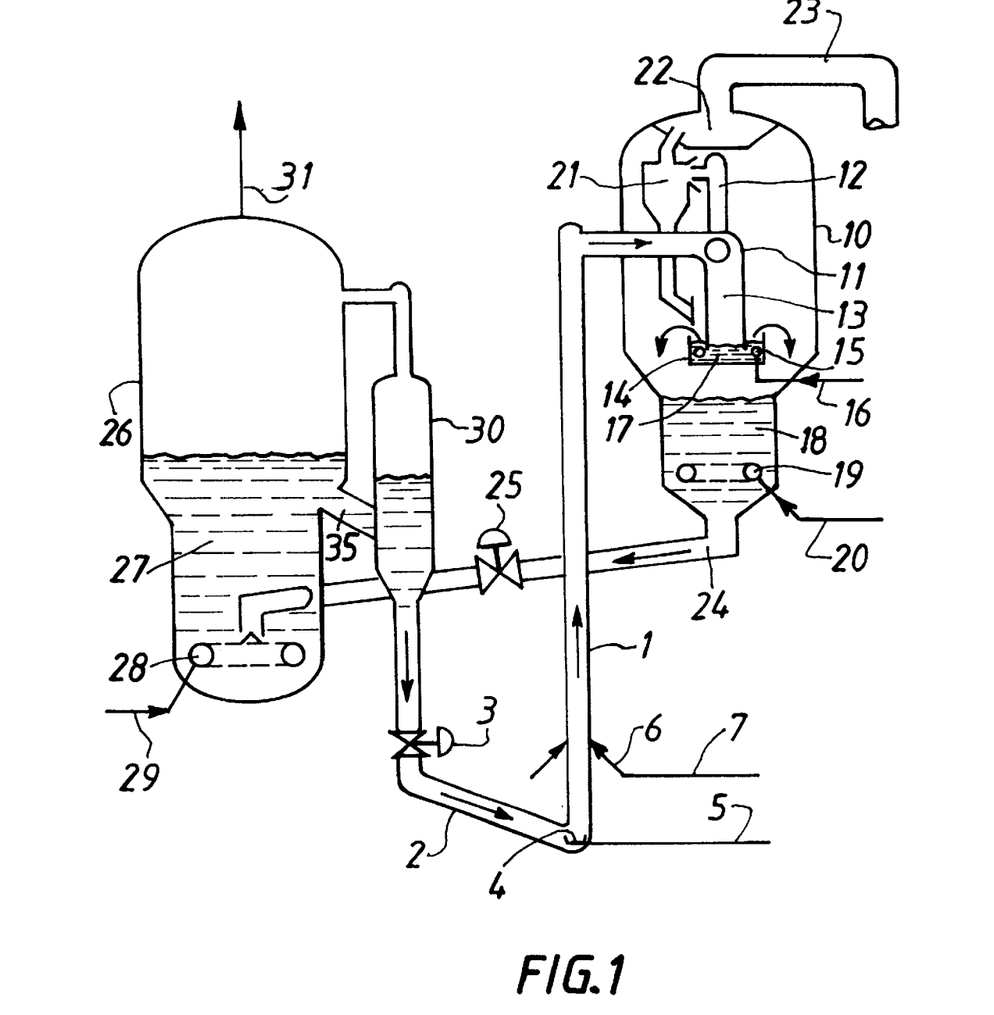
FIG. 1 represents a catalytic cracking unit equipped with a reactor whose flow is essentially upward, at the output of which is integrated a separation device as set forth in the invention.

We will first refer to FIG. 1, which illustrates a form of implementation of the fast separation device as set forth in the invention, intended to perform the separation of the catalyst particles and the reaction effluents at the output of a reactor of a catalytic cracking unit, where this reactor has a flow that is essentially upward.

This unit is of a type known in itself. In particular it consists of a reactor in the form of a column 1, called charge elevator, or "riser", fed at its base by a line 2 with regenerated catalyst particles, with a flow rate that is controlled using a control valve 3. An elevator gas, for example water vapor, is introduced in column 1 through a line 5, using a diffuser 4, whereas the charge to be cracked is transported through a line 7 and injected in the reactor 1 using injectors 6.

At the top of the column 1, the cracked charge and the deactivated catalyst particles are directed toward an enclosure 10, in which the separation of the reaction effluents and the particles takes place, as well as the stripping of the latter.

In the enclosure 10 a fast extraction phase is carried out in less than 0.2 seconds using a ballistic separator 11 that imparts a rotation with a 90 degree angle around a horizontal axis to the flow of gas and particles and results in the projection of particles on the periphery, whereas a portion of the gaseous effluents is extracted laterally, through a conduit 12 that leaves from the axis of the separator 11. The resulting flow, enriched in particles, is directed toward the bottom through a conduit 13 that is more or less vertical.

In accordance with the invention, the conduit 13 opens directly inside a receptacle 14, in which the particles are maintained in the dense fluidized bed status 17 by introduction of a fluidization gas, using a diffuser 15 fed by a line 16. This fluidization gas is introduced with a regulated flow rate, so as to maintain the density of the fluidized bed 17 at a value ranging between 300 and 800 kg.m$^{-3}$, taking into account the size of the receptacle 14 and the flow rate of particles arriving through the conduit 13.

The receptacle 14 is open in its upper part, so that the particles of the catalyst overflow and escape into a stripping fluidized bed 18 located below, where they are stripped against the flow of a stripping fluid, usually water vapor, transported by a line 20 and introduced by injectors or diffusers 19 of fluidization gas evenly placed at the base of the enclosure 10.

The gaseous effluents extracted at the level of the fast separator 11 usually still contain, in a lesser quantity, catalyst particles, that have been sucked into the conduit 12. It is then necessary to foresee one or several secondary means of separation, which make it possible to perform a more in depth separation than that carried out at the level of the fast separator 11. These secondary means of separation advantageously consist of cyclones that make it possible to eliminate all of the remaining particles from the reaction effluent. Here, the extraction conduit 12 of gaseous effluents opens into the entry of a cyclone 21 lodged in the enclosure 10 at the top 22 of which the effluents of the reaction are collected and transported by an discharge line 23 toward a fractionation zone not represented. The deactivated stripped catalyst particles are discharged at the base of the enclosure 10 toward a regenerator 26, through a conduit 24 on which there is a control valve 25. In the regenerator 26, the coke deposited on the catalyst particles is burned with the help of air or another gas rich in oxygen, injected at the base of the regenerator through a line 29, that feeds the injectors or diffusers 28 evenly spaced. The catalyst particles entrained by the combustion gas are separated, for example by the cyclones not represented, and the combustion gas is discharged through a line 31 whereas the catalyst particles escape through a line 35 in the enclosure 30, from where they are recycled in the feed of the elevator 1 through the conduit 2.

The dimensional and operational characteristics of a unit of the type that is represented in FIG. 1 are usually the following:

height of the reactor-elevator 1:5 to 40 meters total feed flow rate of the elevator 1 in charge(s) to be treated: 2000 to 15000 tons per day feed flow rate of the reactor 1 in catalyst: 3 to 50 tons per minute preheating temperature(s) of the charges to be cracked: 70 to 450° C.

cracking temperature in the reactor 1, downstream from the injection zone: 500 to 600° C.

operational pressure in the reactor 1:0.5.10$^5$ to 5.10$^5$ relative Pascals residence time of the charge in the elevator 1:0.1 to 10 seconds regeneration temperature of the catalyst: 600 to 950° C.

residence time of the catalyst in the regenerator 26:2 to 10 minutes

Figure 2:
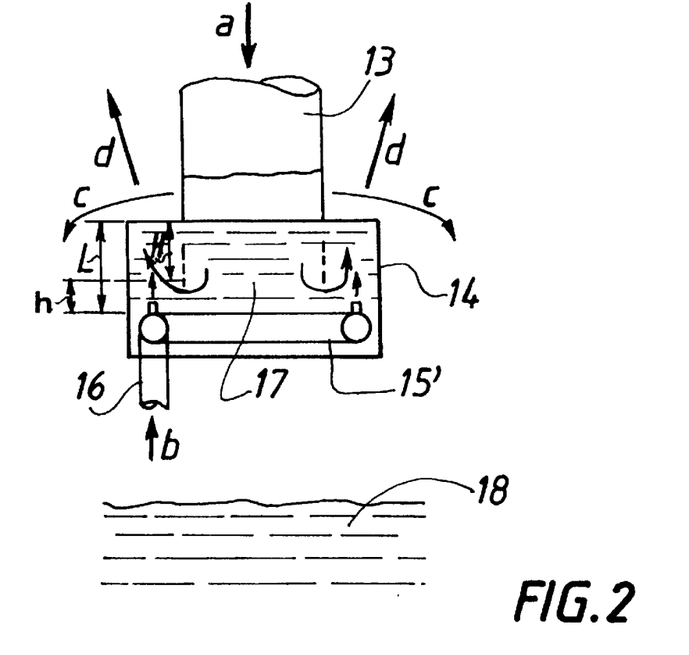
FIGS. 2 and 3 are more detailed views of variants of the receptacle equipped with various types of fluidization gas diffusers.

FIG. 2 is a more detailed view of the receptacle 14 of FIG. 1 in which the arrows indicate the direction of the circulation of the particles and the various fluids present.

The particle enriched flow coming from said fast extraction phase is directed toward the bottom (arrow ) inside the conduit 13 that introduces it directly into the upper half of the dense fluidized bed 17 of height L, contained in the receptacle 14.

Preferably, the receptacle 14 is positioned so that the overflow height H ranges between 50 cm and 2 m, for example equal to 80 cm. On the other hand, the lateral surface at the output of the conduit 13 advantageously ranges between 0.7 and 1.5 times the output section of the conduit 13; it is preferably equal to the output section of this conduit 13. This lateral surface represents the surface of the fictitious hollow cylindrical tube whose section is equal to the section of the conduit 13, and whose height h is equal to L−H.

The bed of particles 17 is fed in fluidization gas transported by the line 16 (arrow b) to the diffuser 15'. This diffuser is comprised of an annular tube equipped with a sufficient number of holes to make possible a homogenous and finely divided introduction of the gas within the bed of particles 17.

The fluidized bed of particles 17 overflows (arrow c) out of the receptacle 14 to escape toward the stripping fluidized bed 18 located below. In parallel, the fluidization gas escapes from the dense fluidized bed 17 and rises above the receptacle 14 (arrow d), carrying with it a portion of the reaction effluents that have not been discharged at the level of said fast extraction phase and were carried away in the conduit 13 with the particle enriched flow.

According to one preferred method, the fluidization gas introduced in the bed 17 contains water vapor, alone or mixed with other gases, in order to favor the desorption of the more volatile portion of the hydrocarbons adsorbed on the deactivated catalyst particles or entrained in the pores said catalyst.

Figure 3:
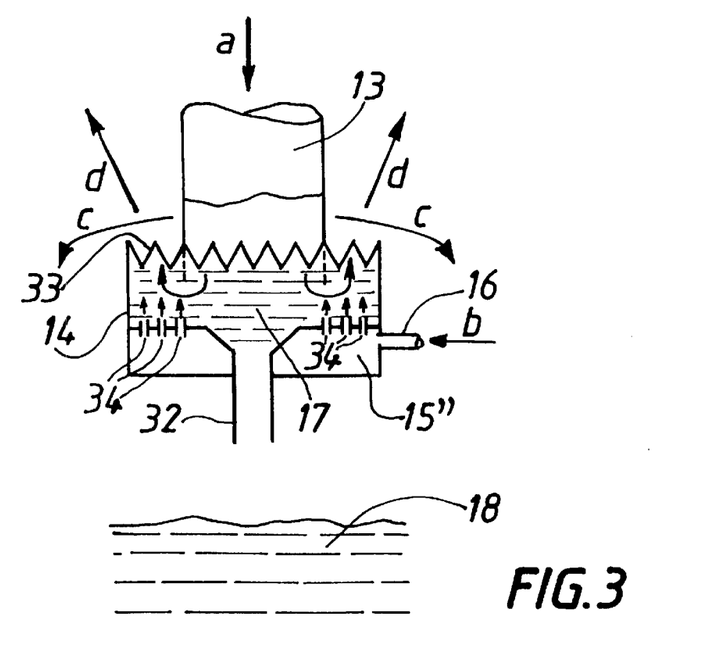

FIG. 3 represents a preferred variant of the receptacle illustrated in FIG. 2. In addition to the elements described in reference to FIG. 2, the receptacle of FIG. 3 consists of a drain 32 of reduced size, that makes it possible to discharge at the base of the receptacle 14 possible agglomerates of catalyst or other debris of refractory material, brought into the receptacle through conduit 13 and that could disturb the development of the dense fluidized bed 17, or even by accumulation, clog the receptacle 14.

The diffuser 15" of fluidization gas is comprised of a chamber that occupies the lower part of the receptacle 14. The upper wall of the chamber 15" is evenly pierced with holes 34, allowing for a good distribution of the fluidization gas at the base of the dense fluidized bed 17. Lastly, the upper edge 33 of the walls of the receptacle 14 is serrated.

Figure 4:
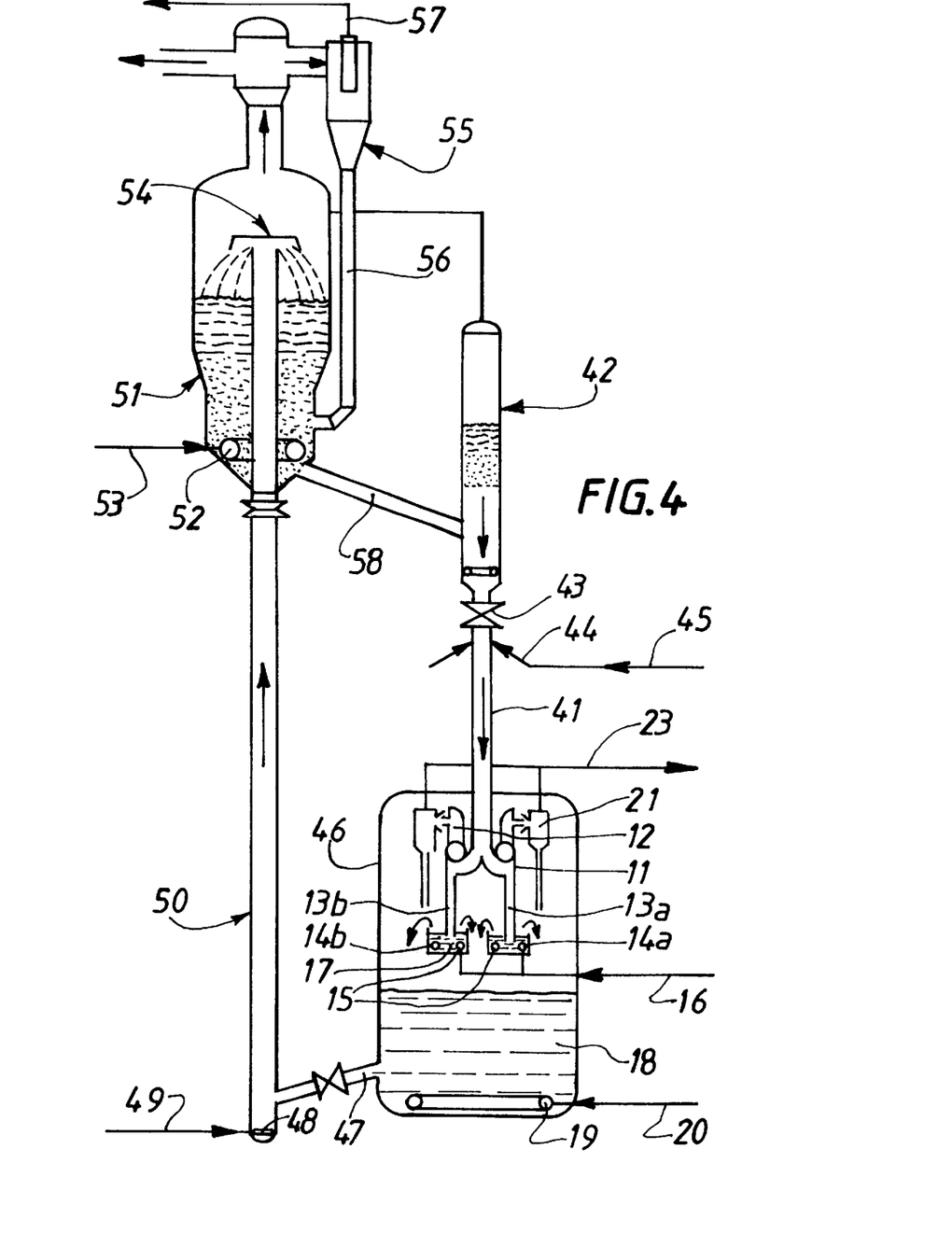
FIG. 4 is a diagram view that illustrates the use of the device as set forth in the invention, in the case of a catalytic cracking unit equipped with a reactor whose flow is essentially downward.

FIG. 4 represents an example of the fast separation device as set forth in the invention for carrying out the separation of catalyst particles and gaseous reaction effluents at the output of the reactor of a catalytic cracking unit equipped with a reactor whose flow is essentially downward.

The device represented consists of a tubular reactor 41 with a downward flow, or "downer", fed in its upper portion, from an enclosure 42, that is concentric to it, with regenerated catalyst particles whose flow rate is controlled by a valve 43. The charge to be cracked is injected into the reactor 41 using injectors-sprayers 44 fed by a line 45. The catalyst particles and the hydrocarbons then escape from top to bottom in the reactor 41 where the cracking reactions take place.

The reaction effluents and the coked catalyst particles then enter into a separation and stripping enclosure 46, located at the base of the reactor 41. The mixture enters into the fast separator 11 where it undergoes a deflection around a horizontal rotation axis, with a simultaneous extraction of at least a fraction of the gaseous effluents through the conduits 12 that open laterally into the separator 11, in the rotation axis of the latter. For a better extraction of the gaseous effluents, the mixture is now separated into two flows, each undergoing the deflection with extraction of the gases, in two parallel chambers. The resulting flow, enriched in catalyst particles, is then transported toward the bottom, toward the stripping zone in a fluidized bed 18, using the two parallel conduits 13a and 13b.

In accordance with the invention, each of the conduits 13a and 13b opens inside a receptacle 14a, 14b open in its upper portion. Each receptacle 14a, 14b is fed at its base in fluidization gas, using diffusers 15, fed through the line 16, that can be common or separate for each of the two receptacles. Each receptacle 14a, 14b consists of a fluidized bed of particles 17, whose density ranges between 300 and 800 kg.m$^{-1}$, from which the solid particles escape by overflow into the stripping fluidized bed 18 located below, where they are stripped against the flow of a stripping fluid transported through line 20 to the diffuser 19.

In the method illustrated in FIG. 4, each of the conduits 13a, 13b opens into its own receptacle 14a 14b, but, according to a variant of the invention, it is completely possible to have the two conduits 13a, 13b open into one single receptacle 12, comprising one single dense fluidized bed of particles.

The gaseous effluents extracted in 12 are transported to the cyclones 21 where a more in depth separation takes place in order to eliminate the low quantity of entrained particles. These particles are then returned in direction of the fluid-bed stripping zone 18, whereas the effluents without particles are discharged through the line 23 that directs them toward a fractionation zone not represented.

The particles of the stripped catalyst are discharged by gravity out of the enclosure 46, through a sloped conduit 47, toward an upward column 50, where they are transported toward the top, toward a regenerator 51, thanks to a carrier gas diffused in 48 at the base of the column 50, from line 49.

The column 50 opens into a regenerator 51, below a ballistic separator 54, that insures the separation of the catalyst particles and the carrier gas. The catalyst particles are then regenerated by combustion of the coke that has deposited on their surface, thanks to a flow of air or oxygen brought by a line 53 to the diffuser 52.

At the upper part of the regenerator 51, the gases emanating from the combustion are discharged toward cyclones 55. The entrained catalyst particles are recycled through a conduit 56 toward the regenerator and the gases are discharged through a line 57. Whereas the particles of the regenerated catalyst are discharged at the base of the regenerator 51 by gravity along a conduit 58, in direction of the enclosure 42.

The following example aims at illustrating the invention and therefore has no restrictive character.

EXAMPLE

Three catalytic cracking tests were performed from a heavy oil charge, consisting of 50% distillate under vacuum and 50% atmospheric residue. This charge has the following properties:

density at 15° C.: 0.925 viscosity at 100° C.: 15.2.10$^{-6}$ m$^2$/s (15.2 centistokes)

distillation point 50% by weight: 484° C.

Conradson carbon residue: 2.5% by weight

Sulfur content: 0.80% by weight

Basic nitrogen content: 682 ppm

Nickel content: 1.8 ppm

Vanadium content: 2.3 ppm

Molecular hydrogen content: 12.3% by weight

The tests were performed in an industrial catalytic cracking unit such as that represented in FIG. 1, that consists of a "riser" type reactor, at the output of which a fast ballistic separator 11 imparts a rotation with a 90 degree angle around a horizontal axis on the mixture to be separated (gaseous effluents and catalyst particles), while laterally extracting at least a fraction of the reaction effluents. The catalyst used is a classic commercial catalyst of the zoelitic type.

For the first test, the transportation conduit 13 toward the bottom of the resulting particle enriched flow of the extraction phase opens directly into the enclosure 10 at 1 m above the level of the stripping fluidized bed 18.

For the second test, the unit is modified in accordance with the invention: at the foot of the conduit 13, between the ballistic separator 11 and the stripping fluidized bed 18, we insert a receptacle 14, positioned so that the conduit 13 plunges into it. This receptacle is consistent with that represented in FIG. 3, it is sized and positioned so that the overflow height H is equal to 50 cm. It is fed with fluidization gas, made of water vapor, with a flow rate D1 controlled in such a way as to establish a catalyst particle fluidized bed state with a density that is equal to 450 kg.m$^{-3}$. From this receptacle, the particles escape essentially by overflow toward the stripping bed 18 located below.

The third test is performed under the same conditions as the second test with an overflow height H equal to 1 m.

The following Table gathers a certain number of operational conditions and summarizes the results of the three tests in terms of quality of the reaction effluents/catalyst grains and of yield of the procedure.

TABLE

|  | Test No 1 | Test No 2 | Test No 3 |
|---|---|---|---|
| Operational Conditions |  |  |  |
| Temperature of the reactor (° C.) | 530 | 535 | 537 |
| Temperature of the regenerator (° C.) | 750 | 738 | 733 |
| Ratio Catalyst/Charge (C/O) | 5.7 | 6.2 | 6.5 |
| Coke Delta | 0.93 | 0.85 | 0.82 |
| Rate of entrained gaseous effluents | 30% | 15% | 5% |
| Yield |  |  |  |
| Conversion (% by weight) | 71.4 | 73.3 | 74.0 |
| Yield in dry gases (% by weight) | 4.2 | 3.7 | 3.4 |
| Yield in LPG (% by weight) | 16.4 | 17.8 | 18.5 |
| Yield in gasoline (% by weight) | 45.1 | 46.0 | 46.4 |
| Yield in distillate (% by weight) | 18.1 | 17.5 | 17.2 |
| Yield in slurry (% by weight) | 10.4 | 9.2 | 8.8 |
| Yield in coke (% by weight) | 5.3 | 5.3 | 5.3 |

The term "rate of entrained gaseous effluents" designates in this case the percentage of gaseous fluids entrained in the conduit 13, with the resulting particle enriched flow, in relation to the initial quantity of gaseous fluids to be separated from the catalyst particles.

The conversion is calculated, in a manner known in itself, using the formula:

Conversion=100 −(% distillate+% slurry).

In the above table, the products obtained are defined as follows:
dry gases: light hydrocarbons with 1 or 2 atoms of carbon and hydrogen sulfide ($H_2S$)
LPG: light hydrocarbons with 3 or 4 atoms of carbon
gasoline: hydrocarbon cut whose boiling range is from 20° C. to around 200° C.
distillate: hydrocarbon cut whose boiling range is from 200° C. to around 360° C.
slurry: distillation residue, that contains significant quantities of catalyst dust and whose boiling range usually goes beyond 500° C.

The results of these three tests confirm the interest of the device and the procedure of the invention.

In tests 2 and 3 as set forth in the invention, the rate of entrained gaseous effluents is remarkably reduced: it is twice as low in test 2 and six times lower in test 3, in relation to test 1 that represents the prior art. The quality of the fast separation performed at the output of the reactor, between the gaseous effluents and the catalyst particles is therefore remarkably improved. The procedure and device as set forth in the invention thus make it possible to conciliate speed and quality in the separations of gaseous fluids and solid particles.

The performances of the catalytic cracking procedure are greatly improved.

On the one hand, the increased efficiency of the separation between the gaseous effluents and the catalyst particles makes it possible to reduce the phenomena of overcracking, which results in a reduction of the rate of coking of the catalyst, illustrated by the Coke Delta parameter (or Coke mass that deposits during the cracking process per unit of catalyst mass). This reduction of the Coke Delta, observed in tests 2 and 3, makes it possible to lower the temperature of the regenerator, to increase the speed of circulation of the catalyst (in other words to increase the C/O ratio) and to increase the temperature of the reactor, which makes it possible to increase the severity of the cracking. Thus conditions that are more favorable to a more in depth and more selective cracking of the charge are established.

On the other hand, the invention makes it possible to effectively increase the selectivity of the cracking reactions: in tests 2 and 3 we note a net reduction of the yields in dry gases and in slurry, which are the undesirable products, as they are not very amenable to beneficiation. This reduction is done to the benefit of the intermediary products that are being sought, such as gasoline, LPG.

These increased performances result in a noticeable gain in conversion matter. The addition, at the foot of the conduit 13, of a receptacle equipped with a catalyst particle fluidization system makes it indeed possible to gain 1.9 conversion points as shown in test 2. In test 3, an optimization of the positioning of the receptacle brings an additional conversion gain of 0.7 points.

These undeniable progresses can be taken advantage of in order to crack the heavier charges, for example with an increased content in residue.

The device and procedure as set forth in the invention thus make it possible to significantly improve the performances of catalytic cracking units, which is all the more appreciable when we want to treat heavy charges, particularly refractory to cracking.

What is claimed is:

1. Device for separating solid particles and gaseous fluids from a mixed solid-gas flow, comprising a ballistic separation system (11) that imparts to the solid-gas flow a rotation around a horizontal axis, said separation system being connected to at least one first conduit (12) for lateral extraction of at least one fraction of the gaseous fluids, and to at least one second conduit (13) which directs the resulting particles enriched flow downwards, toward a fluid bed particles stripping zone (18), wherein said at least one second conduit (13) opens into a receptacle (14) open in its upper part and located above said stripping zone, said receptacle 14 containing at its base at least one diffuser (15) fed with fluidization gas, by which the solid particles in the receptacle (14) are put in a dense fluidized bed state (17), with a density ranging between 300 and 800 kg.m$^{-3}$, and then escape by overflow from the receptacle (14) toward said stripping zone (18) located below.

2. Device as set forth in claim 1, wherein the at least one diffuser (15) is fed with fluidization gas through a line (16) equipped with a means for controlling the flow rate (D1) so as to maintain the surface velocity of this gas in the dense fluidized bed of particles (17) at a value ranging between 0.1 and 40 cm.s$^{-1}$ included.

3. Device as set forth in claim 1, wherein the receptacle (14) is positioned so that the at least one second conduit (13) of transportation toward the bottom of the resulting particle enriched flow opens into the dense fluidized bed of particles (17) contained in this receptacle with an overflow height (H) that ranges between 50 cm and 2 m included.

4. Device as set forth in claim 1, wherein the receptacle (14) is positioned so as that the lateral surface at the output of the conduit (13) of transportation toward the bottom of the resulting particle enriched flow ranges between 0.7 and 1.5 times the section of said conduit (13).

5. Device as set forth in claim 1, wherein the dimensions of the receptacle (14) are such that the dense fluidized bed it contains is smaller than that of the stripping fluidized bed (18), where the section of said receptacle (14) ranges between 1.5 and 6 times that of the conduit(s) (13) that plunge into it.

6. Device as set forth in claim 1, wherein the diffuser (15) consists of a means that makes it possible to free, in a homogeneous and finely divided manner, the fluidization gas at the base of the bed of particles (17) contained in the receptacle (14).

7. Device as set forth in claim 1, wherein the diffuser (15') consists of an annular tube, arranged flat in the lower part of the receptacle and equipped with slits or holes in its upper half.

8. Device as set forth in claim 1, wherein the diffuser (15") consists of a chamber that occupies the lower part of the receptacle (14) and whose upper wall, on which rests said dense fluidized bed of particles (17) is evenly pierced with small holes, through which the fluidization gas is distributed over all the lower surface of the bed (17).

9. Device as set forth in claim 1, wherein the ballistic separation system (11) makes it possible to eliminate from the mixture of gaseous fluids and solid particles at least one fraction of said fluids in a time frame of less than 1 second.

10. Device as set forth in claim 1, wherein the ballistic separation system (11) imparts to the mixed solid-gas flow a rotation with an angle ranging between 30 and 190 degrees around a horizontal-winding axis.

11. Device as set forth in claim 1, wherein the receptacle (14) is equipped at its base with one or several holes or drains (32), with a total section ranging between 3% and 20% of the section of the receptacle (14).

12. Device as set forth in claim 1, wherein the upper edge of the lateral walls(s) of the receptacle (14) are serrated.

13. Device as set forth in claim 1, in which the ballistic separation system (11) divides the mixture of gaseous fluids and solid particles, and the resulting particle enriched flow is transported toward the bottom through at least two parallel conduits (13a, 13b), wherein said two conduits each open inside an independent receptacle (14a, 14b) containing a fluidized bed of particles having a density ranging between 300 and 800 kg.m$^{-3}$.

14. Device as set forth in claim 1, in which the ballistic separation system (11) divides the mixture of gaseous fluids and solid particles, and the resulting particle enriched flow is transported toward the bottom by at least two parallel conduits (13a, 13b), wherein at least two of said conduits open into a common receptacle, containing one single and same dense fluidized bed of particles.

15. Procedure for separating solid particles and gaseous fluids from a mixed solid-gas flow, in which is performed a fast extraction phase whose duration is less than one second, that makes it possible to discharge at least one fraction of said gaseous fluids then, the resulting particle enriched flow is directed toward the bottom, using at least one conduit, toward a fluid-bed stripping zone, wherein said resulting particle enriched flow is directly introduced inside a dense fluidized bed of particles whose density ranges between 300 and 800 kg.m$^{-3}$, arranged above said stripping zone, and entirely contained in at least one receptacle out of which the particles escape by overflow toward said stripping zone located below.

16. Procedure as set forth in claim 15, wherein the bed of particles contained in the receptacle is maintained in a fluidized state by introduction, in its lower part, of at least one fluidization gas, with a flow rate (D1) such that the density of this bed ranges between 300 and 800 kg.m$^{-3}$.

17. Procedure as set forth in claim 15, wherein the flow rate (D1) of the fluidization gas introduced in the receptacle is controlled so as to maintain the surface velocity of this gas in the dense fluidized bed contained in the receptacle at a value ranging between 0.1 and 40 cm.s$^{-1}$ included.

18. Procedure as set forth in claim 15, wherein the fluidization gas is chosen so as to complete a pretreatment of the particles upstream from the treatment that will take place in the stripping zone located below, and the pretreatment is selected from the group consisting of a prestripping, a conditioning, and a passivation.

19. Procedure as set forth in claim 15, wherein the fluidization gas contains water vapor, alone or mixed with other gases.

20. Procedure as set forth in claim 15, wherein the temperature of the dense fluidized bed contained in the receptacle is greater than that of the stripping bed located below.

21. Device as set forth in claim 2, wherein the at least one diffuser (15) is fed with fluidization gas through a line (16) equipped with a means for controlling the flow rate (D1) so as to maintain the surface velocity of this gas in the dense fluidized bed of particles (17) at a value ranging between 0.1 and 20 cm.s$^{-1}$ included.

22. Device as set forth in claim 3, wherein the receptacle (14) is positioned so that the at least one second conduit (13) of transportation toward the bottom of the resulting particle enriched flow opens into the dense fluidized bed of particles (17) contained in this receptacle with an overflow height (H) that ranges between 50 cm and 1 m included.

23. Device as set forth in claim 6, wherein the diffuser (15) consists of an arrangement of one or several tubes in a cluster, and evenly equipped with slits or holes.

24. Device as set forth in claim 9, wherein the ballistic separation system (11) makes it possible to eliminate from the mixture of gaseous fluids and solid particles at least one fraction of said fluids in a time frame of less than 0.5 seconds.

25. Device as set forth in claim 24, wherein the ballistic separation system (11) makes it possible to eliminate from the mixture of gaseous fluids and solid particles at least one fraction of said fluids in a time frame of less than 0.2 seconds.

26. Procedure as set forth in claim 15, wherein the flow rate (D1) of the fluidization gas introduced in the receptacle is controlled so as to maintain the surface velocity of this gas in the dense fluidized bed contained in the receptacle at a value ranging between 0.1 and 20 cm.s$^{-1}$ included.

27. Procedure as set forth in claim 16, wherein the bed of particles contained in the receptacle is maintained in a fluidized state by introduction, in its lower part, of at least one fluidization gas, with a flow rate (D1) such that the density of this bed ranges between 600 and 700 kg.m$^{-3}$.

28. A thermal or catalytic cracking process, in which catalytic particles are contacted with at least a feed of hydrocarbons in a tubular reactor at the outlet of which they are separated by the procedure of claim 15, wherein the tubular reactor is a riser or downer reactor.

29. A thermal or catalytic cracking device, comprising a reactor containing the device of claim 1 at the outlet of the reactor, wherein the reactor is a riser or downer reactor.

* * * * *